United States Patent [19]

Ross et al.

[11] Patent Number: 4,652,205
[45] Date of Patent: Mar. 24, 1987

[54] ROBOT CELL SAFETY SYSTEM

[75] Inventors: Joseph Ross, Salonga; Howard Stern, Greenlawn, both of N.Y.

[73] Assignee: Robotic Vision Systems, Inc., Hauppauge, N.Y.

[21] Appl. No.: 729,960

[22] Filed: May 2, 1985

[51] Int. Cl.4 .............................................. B25J 19/00
[52] U.S. Cl. ...................................... 414/786; 901/49; 901/47; 414/730; 414/5; 250/221
[58] Field of Search ........................... 414/786, 5, 730; 901/47, 49; 250/221, 222.1

[56] References Cited

U.S. PATENT DOCUMENTS

| | | | |
|---|---|---|---|
| 3,746,863 | 7/1973 | Pronovost | 250/221 X |
| 3,858,043 | 12/1974 | Sick et al. | 250/221 |
| 4,105,925 | 8/1978 | Rossol et al. | 901/47 X |
| 4,446,602 | 5/1984 | Marx et al. | 250/221 X |

FOREIGN PATENT DOCUMENTS

| | | | |
|---|---|---|---|
| 661094 | 4/1963 | Canada | 250/221 |
| 87485 | 5/1983 | Japan | 250/221 |

Primary Examiner—Terrance L. Siemens
Attorney, Agent, or Firm—Max Fogiel

[57] ABSTRACT

Arrangements for detecting the presence of an opaque object in an area, such as a person in a robotic work cell. Multiple light sources, light reflecting surfaces, light boxes with hole patterns or fiber optic light sources are spaced around the perimeter of the area and imaged by a camera. The change of the camera signal from its normal condition is used to interrupt power to safeguard personnel and/or machinery.

2 Claims, 10 Drawing Figures

Illustrates schematically the signal processing required for Figure 2a.

ROBOT CELL SAFETY SYSTEM

BACKGROUND OF THE INVENTION

Light curtains are usable to detect the crossing of persons into a robot cell. In the prior art, multiple light transmitters and receivers have been used for this purpose. It is desirable to reduce the complexity, amount of wiring, physical size, failure rate and cost for such systems. The present invention addresses these goals.

SUMMARY OF THE INVENTION

It is the object of the present invention to overcome the prior art disadvantages. In particular, it is the object of the present invention to simplify the implementation of light curtain safety devices.

In keeping with this object, and with still others which will become apparent as the description proceeds, the important characteristics of the present invention are, the replacement of multiple receiving devices with a single receiver, the use of a reflecting surface to remove the need for wiring at one end of the system and a means for coordinating the collection of the data into a complete programmable safety system. Improved methods of generating the multiple point light source are also given.

One aspect of the present invention involves replacing the multiple receivers of a conventional light curtain with a TV camera that encompasses all thelight transmitting elements within its view. The TV camera has the further advantage that the multiple light sources need not be restricted to lie in a line, but can be anywhere within an area. Ambiguities that are introduced by such freedom of placement may be resolved by selectively illuminating groups of light sources. The system is calibrated for normal conditions, and indicates intrusion when the light from any one, or more, of the light sources disappears or is significantly attenuated.

A second aspect of the present invention involves projecting light onto a reflecting surface to serve as the source of light for the intrusion detection. A means for changing the reflectance or projected light level is used to train the system where, in the camera's angular volume, the desired light monitoring is to be performed.

A third aspect of the present invention involves generating the multiple point light source by means other than individual light sources such as LED's. One low-cost arrangement would be a fluorescent light behind an opaque shield with a line of holes or a slit. Another arrangement would be a single source of light used with optical fibers to provide the multiple point light source.

A final aspect of the invention comprises an arrangement for coordinating multiple light source groups and/or cameras together into a readily trainable system for use on the factory floor.

The present invention will hereafter be described with reference to an exemplary embodiment, as illustrated in the drawing. However, it is to be understood that this embodiment is illustrated and described for the purpose of information only, and that nothing therein is to be considered limiting of any aspect of the invention.

DESCRIPTION OF THE DRAWINGS

FIG. 2d is a schematic view and illustrates the signal processing required for FIG. 2a;

DESCRIPTION OF THE PREFERRED EMBODIMENTS

Figure 1:
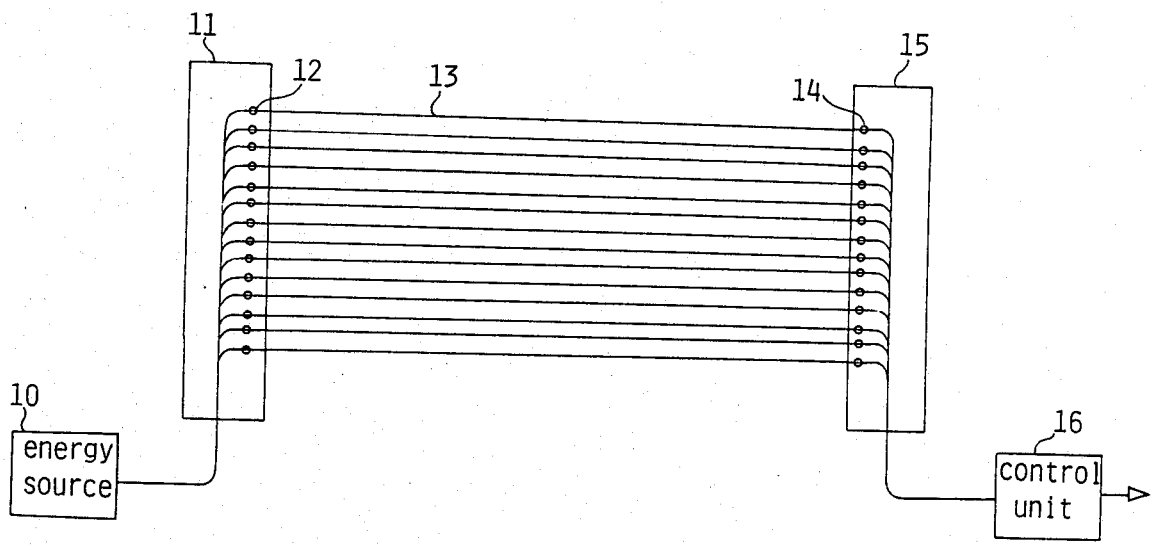
FIG. 1 is a diagrammatic view and illustrates a prior art light curtain.

FIG. 1 illustrates the prior art in light curtains. Energy source 10 energizes each light source 12 mounted on support 11. Photodetectors 14 mounted on support 15 receive light from light sources 12 along paths 13 as long as no opaque object intervenes. Detectors 14 individually report the unbroken light paths 13 to control box 16 which may remove power from a robot within an area guarded by the light curtain. Several light curtains are generally employed to completely surround the robot cell to prevent access by anyone while power is applied to the robot. A major flaw is that a person (or object) inside the curtain-protected area, is not protected when power is turned on for the robot. Detection only occurs when a part of the curtain is broken and the curtains traditionally are place like any other kind of barrier; vertically around the perimeter.

Figure 2A:
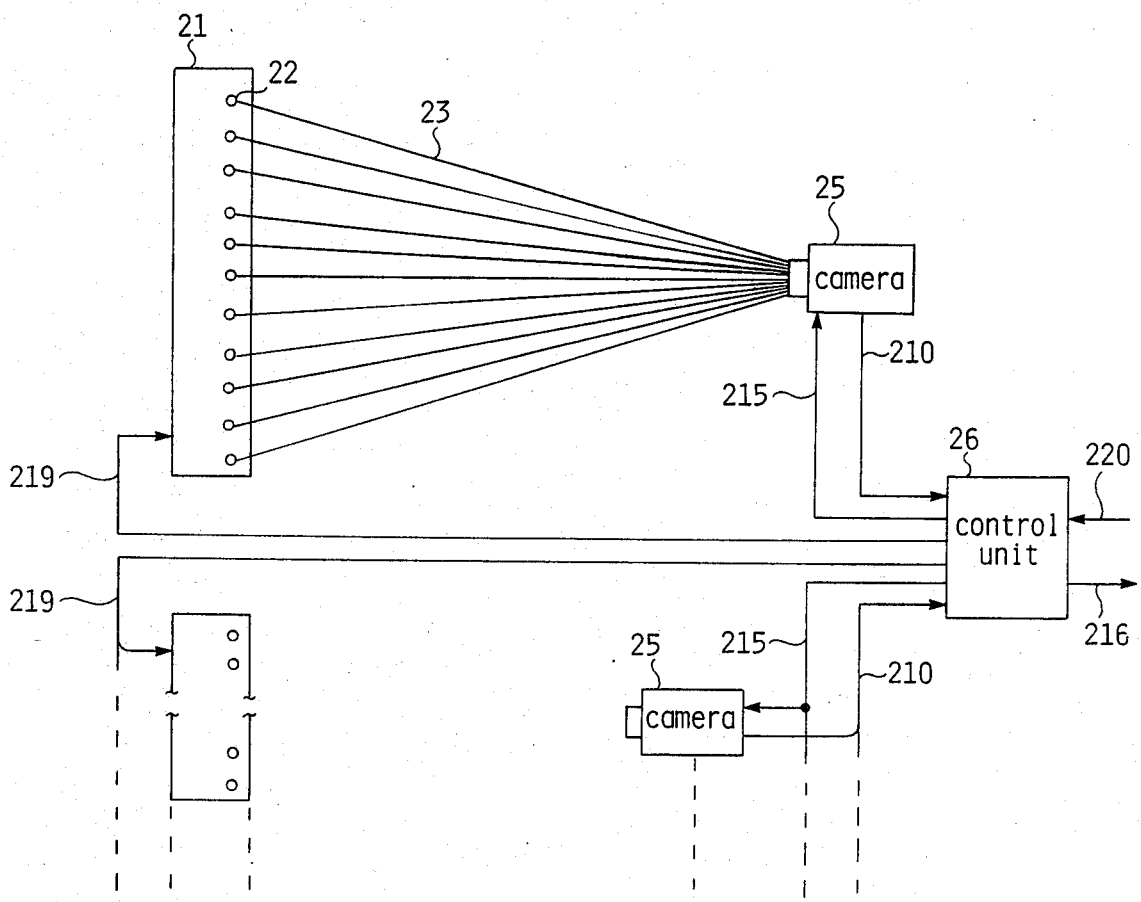
FIG. 2a is a schematic view and illustrates using a TV camera as a light curtain receiver.

FIG. 2a presents one arrangement of the present invention. Light sources 22 mounted on support 21 operate as in the prior art. However, camera 25 replaces the array of photodetectors. Camera 25 collects the light traveling along paths 23 from light sources 22 and images the light sources on a light-sensitive surface which converts the light image to an electronic video signal 210. The video signal 210 is processed in control box 26 to monitor the light traveling along paths 23 to shut power down to a robot guarded by the light curtain, if any light path 23 is greatly attenuated.

More than one structure 21 and camera 25 combination will ordinarily be employed. Therefore, control box 26 may have to control light sources 22 with control lines 219 to each structure 21, during training of the system, for control box 26 to learn which detected images belong to which structure 21. For example, there may be a requirement in a robot cell, as shown in plan view in FIG. 2c, to allow the robot to break the light curtain in area A at certain times without shutting down power. It is desired during that time to continue to shut power down if there is a detected obstruction in area B. An extra structure 21 is shown in separating the regions, and the associated camera 25 is elevated above and aimed downward, toward the two central structures 21 in its view, to be able to image them both at the same time. FIG. 2e illustrates the conditions with an elevation view. Structures 21 lie on the floor and camera 25 has a clear line of sight to both. By turning control line 219 on for one structure 21 at a time, the system can be taught which image set belongs to which structure 21, and the logic needed to distinguish region B (covered by both) from region A can be implemented. The robot controller can inform control box 26 via signal line 220 when region A should be ignored, and control box 26 will just accept warning signals from region B.

Figure 2B:
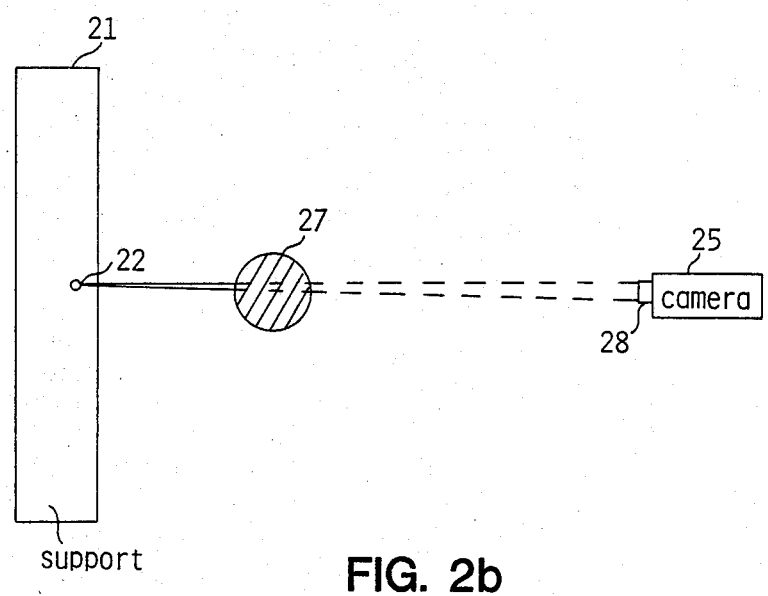
FIG. 2b is a schematic view and illustrates the light rays collected by the camera lens being blocked by an intruding object.

FIG. 2b illustrates that the light collected from any one light source is collected over the aperture 28 of camera 25. Therefore the intruding object 27, if sufficiently narrow, would block only part of the light and not be detected. This will ordinarily have no adverse consequence since the detection of the intrusion of a significant part of a person (or object) into the robot working area is the desired object of the invention.

Figure 2C:
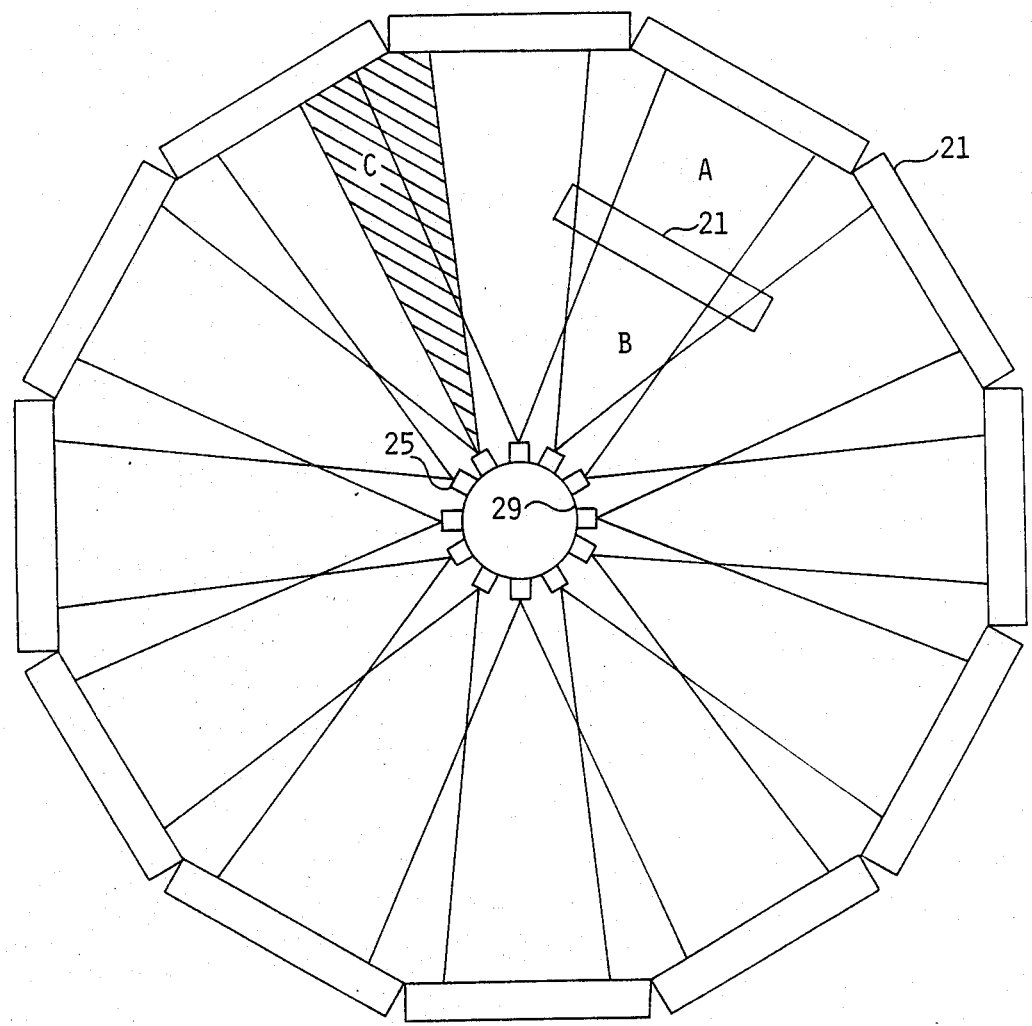
FIG. 2c is a schematic view and illustrates an arrangement of the present invention for full coverage of a robotic work cell.

FIG. 2c illustrates the preferred deployment of the invention. Light source supporting structures 21 can be placed on the floor around the outer perimeter of the working area of robot 29. Cameras 25 can be placed on (or above) the floor adjacent to the pedestal of robot 29 with lens view angle to image more than one light support structure 21. The overlapping coverage of adjacent cameras 25 assure reliable coverage of the area into which a person must first step when entering the work area of robot 29.

The arrangement of FIG. 2c is particularly an improvement over the prior art method of arranging vertical light curtains around the work cell. In the prior art arrangement, a worker is not detected if he is inside the perimeter at the time power is applied. The arrangement of FIG. 2c would detect the worker's presence and prevent power from being applied. In a similar manner, any object with suitable dimensions to block sufficient light, such as a step ladder, that is inadvertently left in the work cell, would be detected by the arrangement of 2c, but not by the prior art arrangement.

Figure 2D:
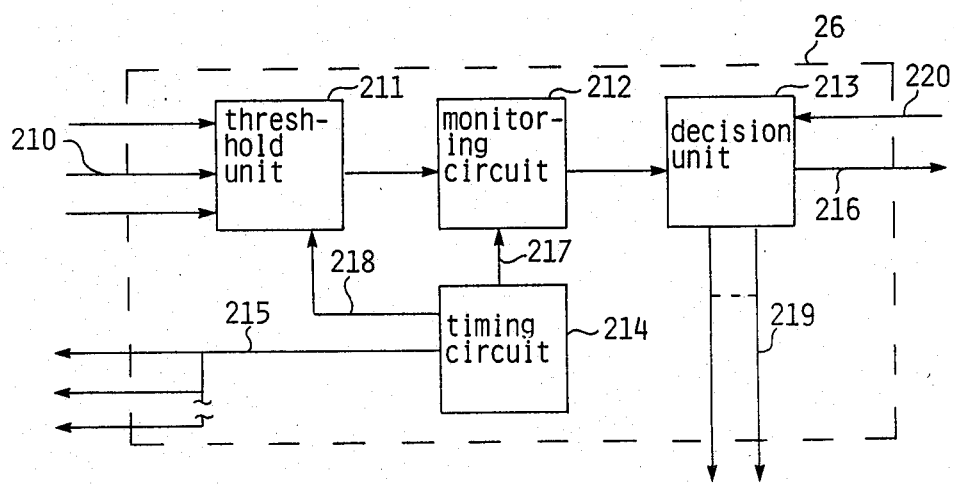
Figure 2E:
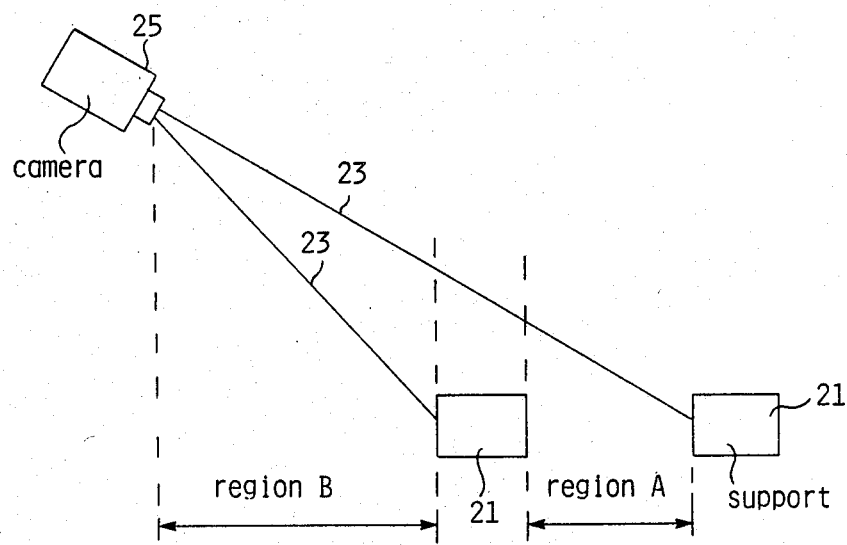
FIG. 2e illustrates a side view of a part of FIG. 2c.

FIG. 2d schematically represents the typical arrangement for processing the camera video signal 210 within control box 26. A thresholding device 211 compares signal 210 level to a threshold level set typically halfway between the minimum expected level from the light source 22 and the maximum background level. The quantized output of device 211 is fed to monitoring circuit 212. Timing circuit 214 provides synchronizing signals 215 and 217 to camera 25 and monitor circuit 212, respectively. Monitor circuit 212 typically reports the time interval, relative to the start of a video signal frame, that video signal 210 is found to be above the threshold of device 211. Decision device 213 records, typically in non-volatile memory, the time intervals reported by monitor circuit 212 at the initial setup time of the system. False signals from bright objects in the field of view of camera 25 are removed by noting which ones do not disappear when control lines 219 turn off all light sources 22. The non-disappearing signals are false and are removed from the memory. Thereafter, decision device 213 turns off power to robot 29 motor drives via control line 216 if a threshold crossing is not detected in each of the remaining memorized intervals. Signal line 220 from the robot controller can advise the decision device 213 which of several strategies is desired at any one time.

Control box 26 can be expanded to control multiple cameras 25 and light sources 21 as shown in FIG. 2a. The synchronizing signals 215 can be common for all cameras. The camera outputs 210 must be separate for cameras 25, and selected within thresholding device 211 by time sequencing signal 218. The sequencing signal 218 could be derived under control of decision device 213 for greater sophistication than shown. Decision device 213 would turn on groups of light sources 22 via separate control lines 219 for each structure 21 during training, if necessary, to resolve ambiguities as explained above. During active use, all light sources 22 would generally be activated by control lines 219. If areas such as the previously discussed regions A or B, or an angular segment such as region C in FIG. 2c need to be ignored, the logic within device 213 is programmed for that purpose.

Figure 3:
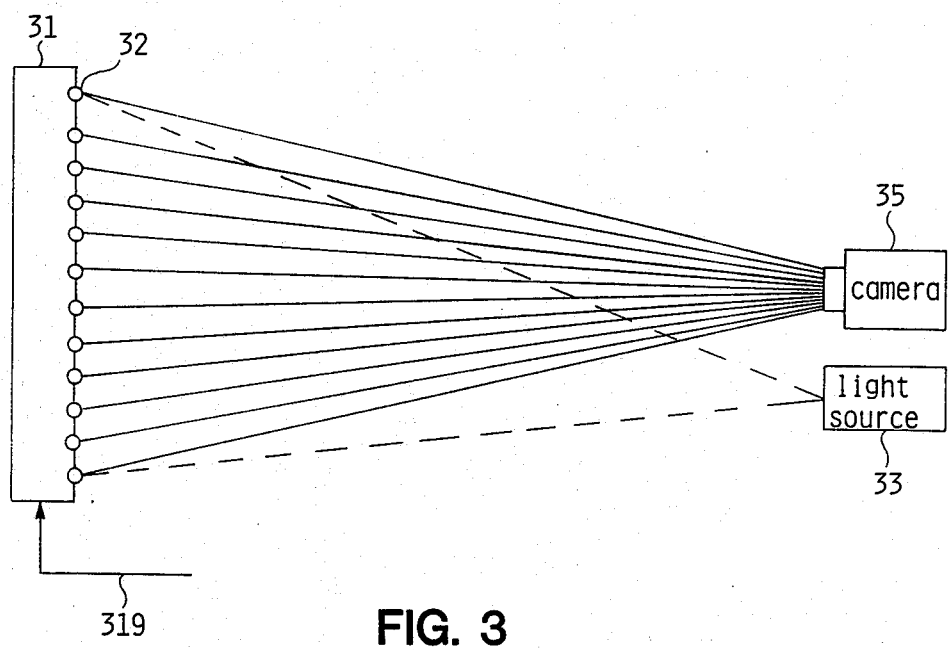
FIG. 3 is a schematic view and illustrates a source of illumination, a reflecting surface and a receiving camera.
Figure 3A:
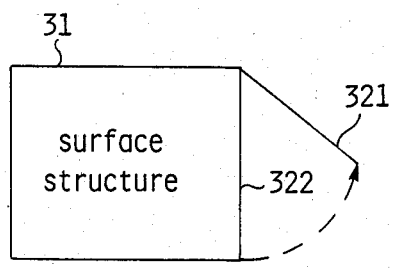
FIG. 3a shows an end view of the reflecting surface with a cover partially open.

FIG. 3 illustrates an arrangement for obtaining multiple point light sources without the need for individual light sources on structure 31 nor for the associated wiring. Light source 33 illuminates the surface of structure 31. The surface may be prepared to enhance its reflective nature by any well known technique to improve system performance and/or reduce the light source 33 light intensity requirements. A control signal 319 may be used to change the reflectivity of the surface structure 31, or turn off illumination source 33, if necessary, for system training or operation. FIG. 3a shows an end view of a typical way in which structure 31 surface reflectivity can be changed. A portion of surface 322 of structure 31 may be very reflective to provide the normal source of reflected light imaged by camera 35. Under control of signal 319, a cover 321 can be brought over the reflective area to attenuate the reflectance. Camera 35 and succeeding circuitry functions in the same manner as previously described. It should be noted that since the light paths may be broken on the way from light source 33, or to camera 35 with identical results, a greater area coverage can be obtained.

Figure 4:
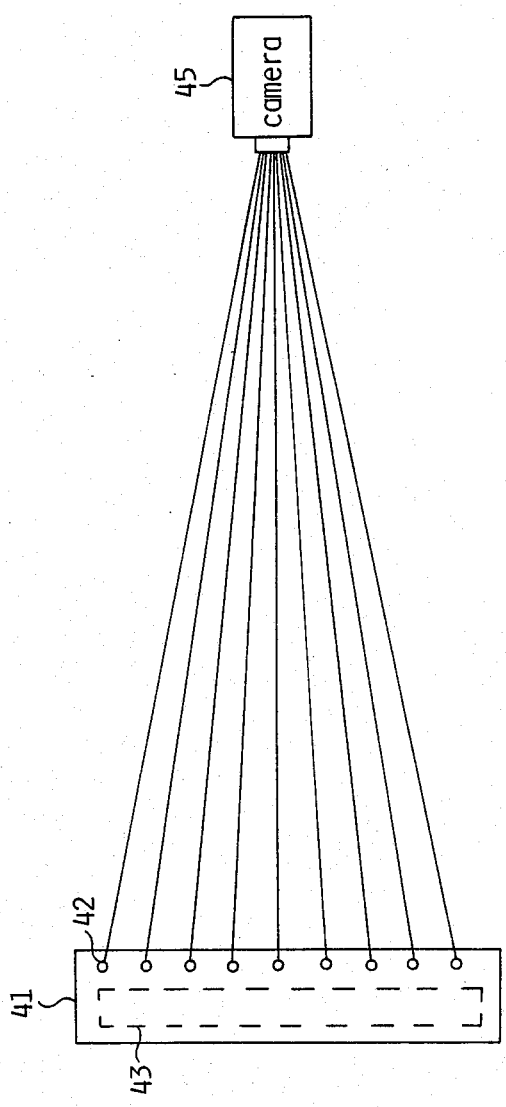
FIG. 4 is a schematic view and illustrates a fluorescent light source providing a multiple point light source.

FIG. 4 illustrates an arrangement for obtaining multiple point light sources without the need for individual light sources on structure 41. Fluroescent light source 43, or equivalent, is housed within structure 42. Openings or holes 42 are made at intervals along structure 41 to emit light. The light-filled holes 42 are imaged by camera 45 which functions with succeeding circuitry in the same manner as discussed above. A continuous opening instead of holes can also be used.

Figure 5:
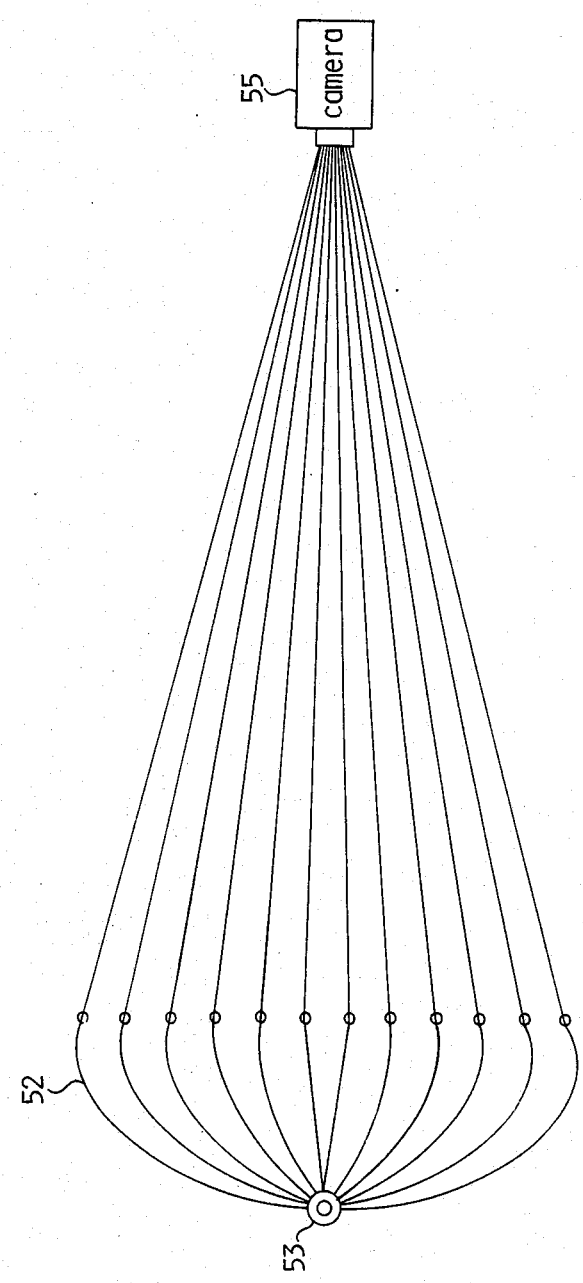
FIG. 5 is a schematic view and illustrates the use of fiber optics to generate a multiple point light source.

FIG. 5 illustrates an arrangement for obtaining multiple point light sources without the need for individual light sources. A single light source 53 provides light that is collected by fiber light guides 52 which guide the light to the desired pattern location for imaging by camera 55, as previously discussed. The ends of the fibers 52 need not be lined up as shown, but positioned at whatever location is needed in the camera 55 field of view.

The invention has been described and illustrated with reference to an exemplary embodiment. It is not be considered limited thereto, inasmuch as all modifications and variations which might offer themselves are intended to be encompassed within the scope of the appended claims.

What is claimed is:

1. A method for training a robot safety system of light curtains comprising the steps of: recording time intervals within a camera frame reporting light signals above a set threshold; removing from said time intervals set time interval reports that do not disappear when a light curtain source is turn off; turning on sequentially parts of the light curtain to resolve ambiguities; and programming an alarm criterion from recorded data and messages to be received from a robot controller means.

2. An method as defined in claim 1, wherein said light curtain source comprises a plurality of light sources.

* * * * *